Figure 1:
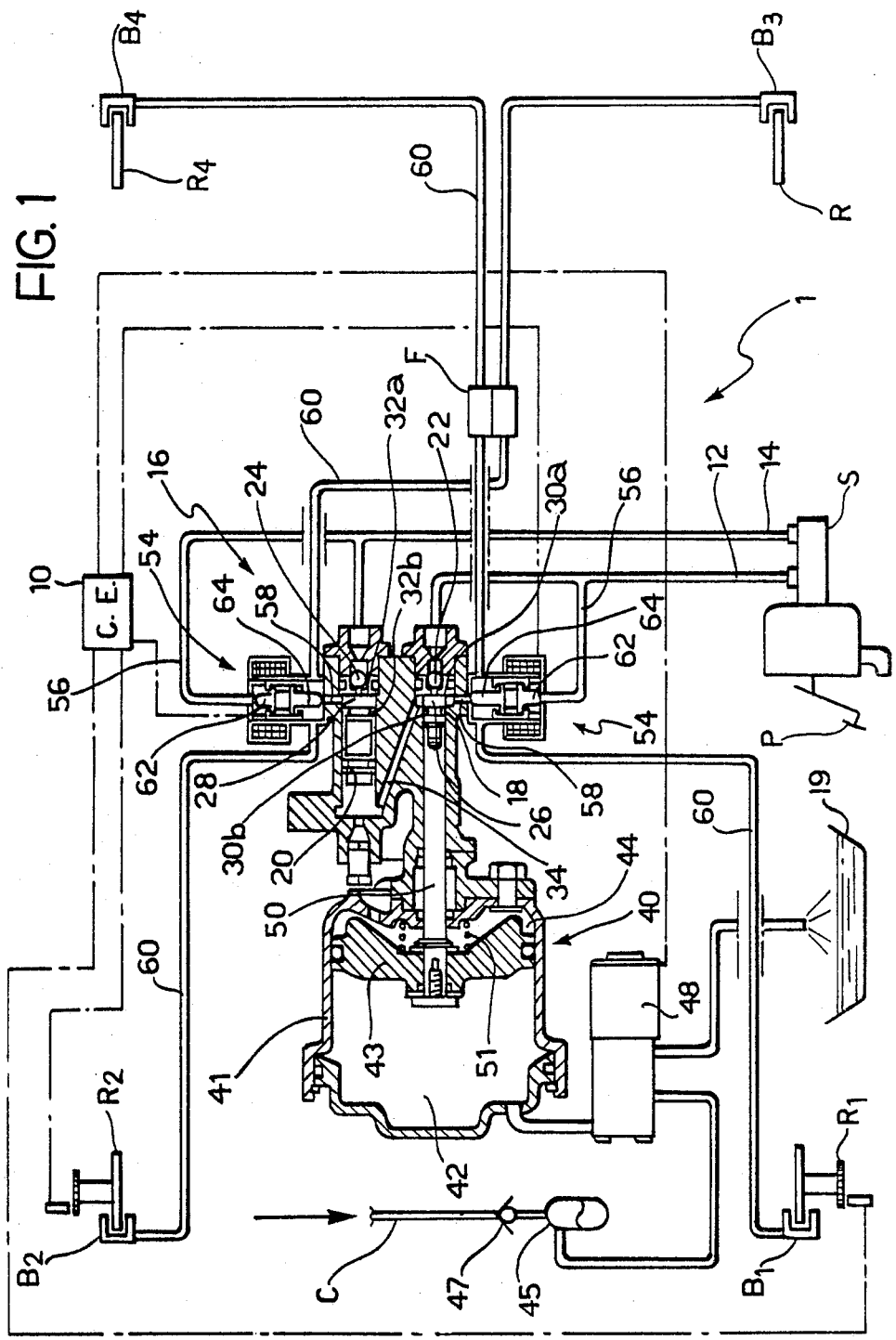

United States Patent [19]

May et al.

[11] Patent Number: 4,799,742
[45] Date of Patent: Jan. 24, 1989

[54] FLUID PRESSURE DEVICE FOR OPERATING THE BRAKE MEMBERS OF A VEHICLE WITH A WHEEL ANTI-LOCKING FUNCTION

[75] Inventors: Pierluigi May, Milan; Virginio Maggioni, Rosta, both of Italy

[73] Assignee: Industire Magneti Marelli S.r.l., Milan, Italy

[21] Appl. No.: 180,869

[22] Filed: Apr. 13, 1988

[30] Foreign Application Priority Data

Apr. 14, 1987 [IT] Italy .............................. 67308 A/87

[51] Int. Cl.$^4$ .............................................. B60T 8/02
[52] U.S. Cl. ...................................... 303/115; 303/119
[58] Field of Search ............... 303/113, 114, 115, 119, 303/111; 60/561, 581, 547.1

[56] References Cited

U.S. PATENT DOCUMENTS

| | | | |
|---|---|---|---|
| 3,480,335 | 11/1969 | Inada | 303/115 |
| 3,512,844 | 4/1970 | Stelzer | 303/119 X |
| 3,921,666 | 11/1975 | Leiber | 303/119 |
| 4,095,851 | 6/1978 | Ando et al. | 303/115 |
| 4,264,111 | 4/1981 | Shimizu et al. | 303/115 |
| 4,269,456 | 5/1981 | Kondo et al. | 303/115 |

Primary Examiner—Andres Kashnikow
Assistant Examiner—Matthew C. Graham
Attorney, Agent, or Firm—Sughrue, Mion, Zinn, Macpeak & Seas

[57] ABSTRACT

A fluid pressure device for operating the brake members of a vehicle with a wheel anti-locking function includes a fluid pressure actuator controlled by a control circuit including sensors arranged to detect the tendency of the wheels to lock, in order to interrupt the braking action. The pressurized fluid from, for example, the lubrication circuit of the engine and passing through a three-way solenoid valve piloted by the control circuit may act in the sense corresponding to activation or de-activation of the actuator, against the action of a resilient biassing member.

4 Claims, 2 Drawing Sheets

FLUID PRESSURE DEVICE FOR OPERATING THE BRAKE MEMBERS OF A VEHICLE WITH A WHEEL ANTI-LOCKING FUNCTION

The present invention relates to fluid pressure devices for operating the brake members for the wheels of a vehicle.

In particular, the invention concerns a device which enables the locking of one or more wheels of a vehicle, with the consequent loss of road-holding, to be avoided during braking.

The object of the present invention is to provide a device of the type specified above which combines characteristics of simplicity and cheapness of manufacture and characteristics of high reliability and efficiency of operation.

According to the invention, this object is achieved by means of a device for the selective application to groups of brake members associated with the wheels of a vehicle of a fluid operating pressure generated by a source, characterised in that it comprises:

a fluid distributor member with a first chamber and a second chamber, each of which carries, for its connection of the source, an associated respective one-way flow valve which can prevent the propagation of fluid pressure from the source to the respective chamber, a piston being sealingly slidable in each chamber and dividing the chamber itself into a first space communicating with the one-way flow valve associated with the respective chamber and a second space the first space of the first chamber communicating with the second space of the second chamber; each piston carrying associated actuator means which can keep the one-way flow valve associated with the respective chamber in its open condition when the piston itself is in a position of advancement towards the first space of the respective chamber, actuator means selectively operable to apply to the piston mounted in the first chamber a thrusting force directed so as to move the piston itself into a position of advancement towards the first space of the first chamber itself, for each of the first and second chambers and for each group of brake members, a respective valve member with a first intake duct which can be connected to a source of pressurised operating fluid, a second intake duct communicating with the first space in the respective chamber, and at least one further duct communicating with the brake members of the group; the valve member including first obturator means interposed in the first intake duct and being normally open and second obturator means interposed in the second intake duct and being normally closed, a braking control circuit with sensor means which can detect the tendency of the wheels associated with the brake members to lock, and which can, upon a manifestation of the tendency to lock, control in a selectively predetermined sequence:

the de-activation of the actuator means, with the cutting off of the thrusting force, the closure of the first obturator means of the respective valve member, and the opening of the second obturator means of the respective valve member, and wherein the actuator means include a fluid pressure actuator with a cylinder and a piston, in which the piston is operatively connected to the piston mounted in the first chamber of the fluid distributor member and divides the cylinder into two spaces of which the first is connected to a pressurised fluid source and the second contains a resilient biassing member which acts on the piston in the opposite sense from the thrust of the pressurised fluid, and a three-way solenoid valve member for controlling communication between the first chamber of the actuator and the pressurised fluid source on the one hand and between the first chamber and a discharge on the other, the solenoid valve member being piloted by the braking control circuit.

The fluid pressure may act on the piston of the actuator in the sense corresponding to the position of advancement of the piston mounted in the first chamber of the fluid distributor member or in the opposite sense.

The fluid source for the supply of the actuator may be constituted by the lubricating circuit of the engine of the vehicle, by a pneumo-hydraulic accumulator supplied by the lubricating circuit, or even, as an alternative, by the circuit for the engine cooling liquid or by a circuit with an auxiliary pump.

Figure 2:
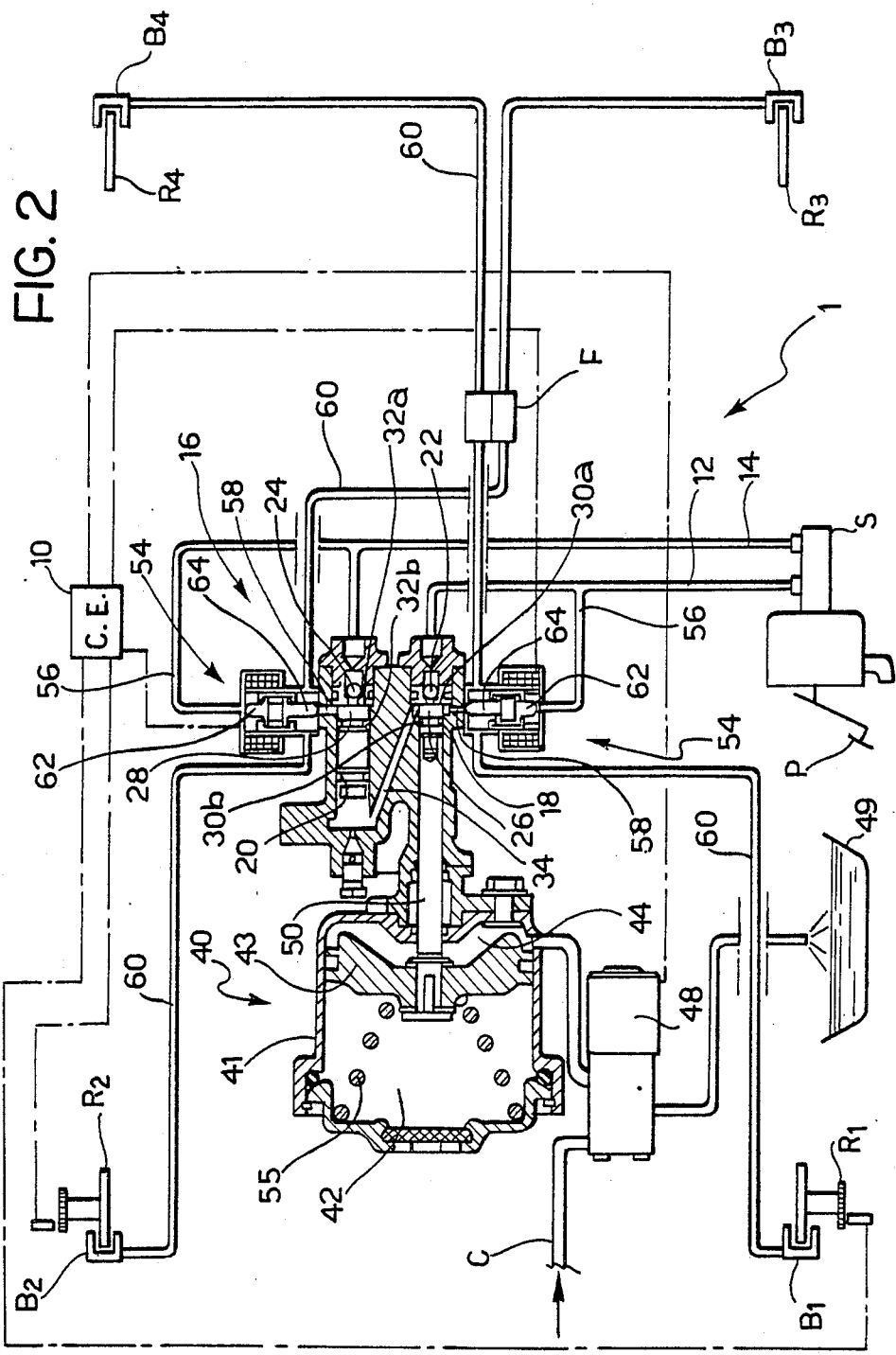

The invention will now be described purely by way of non-limiting example with reference to the appended drawings, in which:

FIG. 1 illustrates a first embodiment of a device according to the invention in diagrammatic form, and FIG. 2 shows a variant of FIG. 1.

In both Figures, the brake groups associated with the four wheels (not illustrated) of a motor vehicle are indicated schematically $B_1$, $B_2$, $B_3$ and $B_4$.

More precisely, the references $B_1$, $B_2$ indicate the brakes associated with the left-hand and right-hand front wheels respectively, while the references $B_3$ and $B_4$ indicate the brakes associated with the rear wheels, again the left-hand and right-hand wheels respectively.

During braking and according to criteria which will be explained more fully below, the fluid pressure generated by a source S constituted, in the embodiment illustrated, by the master cylinder of a normal braking system operable by the driver of the motor vehicle by pressure on a pedal P is applied to the brakes $B_1$–$B_4$.

In the present description below, constant reference will be made to a device in which the fluid operating pressure for the brakes is a hydraulic pressure. However, the solution according to the invention may also be applied to pneumatic braking systems.

The motor vehicle in which the device according to the invention is mounted is generally indicated 1 and is driven by an internal combustion engine provided with a pressurised-oil lubricating circuit including, in known manner, a hydraulic pump, not illustrated, and a sump. A portion of this lubricating circuit is indicated C.

References $R_1$, $R_2$, $R_3$ and $R_4$ indicate movement sensors each of which can output a signal indicative of the rate of rotation of the wheel with which the sensor is associated.

The sensors $R_1$–$R_4$ may for example be phonic wheel sensors.

The function of the sensors $R_1$–$R_4$ is to enable a control circuit 10, the operation of which will be more fully described below, to detect when—during braking—one or more of the vehicle wheels is close to locking and hence losing its grip on the ground.

Two outlets lines are indicated 12 and 14 through which the braking fluid pressure generated by the source F is conveyed to the brake members $B_1$–$B_4$. In the embodiments illustrated (a braking system with a diagonal configuration) the members $B_1$ and $B_4$ form a first group, while a second group is constituted by the brake members $B_2$ and $B_3$. However, they can be divided into different groups in known manner.

A hydraulic distributor, generally indicated 16, includes a first chamber and a second chamber, indicated 18 and 20 respectively, connected to the line 12 and to the line 14 respectively through one-way ball valves 22 and 24. The obturators of the valves 22 and 24 can oppose the propagation of fluid operating pressure from the lines 12 and 14 to the chambers 18 and 20.

Two pistons 26 and 28 are sealingly slidable in the chambers 18 and 20. Each piston divides the respective chamber into a first space 30a, 32a communicating with the respective one-way valves 22 and 24 and a second space 30b, 32b.

A duct 34 extends generally obliquely within the body of the distributor 16 and puts the first space 30a of the first chamber 18 into communication with the second space 32b of the second chamber 20.

Each of the pistons 26, 28 is also provided with an appendage which projects from the face of the piston facing the first space 30a, 32a of the respective chamber 18, 20 towards the obturator of the corresponding one-way valve 22, 24.

The function of these appendages is to move and hold the respective one-way valve 22, 24 in the open position when the piston 26, 28 is in its position of advancement within the first space 30a, 32a of the respective chamber 18, 20.

A fluid pressure actuator is generally indicated 40 and includes cylinder 41 and a piston 43 sealingly slidable within the cylinder 41 and dividing it into first and second chambers 42, 44. The chamber 42 is connected through a three-way solenoid valve 48 to a pneumo-hydraulic accumulator 45 communicating through a one-way valve 47 with a lubricating circuit C of the vehicle engine.

The solenoid valve 48 is normally open so as to open communication between the accumulator 45 and the chamber 42 of the actuator 40. In its closed position, however, this valve 48 closes communication between the accumulator 45 of the chamber 42 and opens communication between the latter and a discharge 49 constituted, for example, by the oil sump of the engine or by a recovery tank.

A helical compression spring 51 is inserted in the chamber 44 of the actuator 40 and biasses the piston 43 towards the chamber 42.

A thrust rod 50 fixed to the piston 43 extends into the chamber 18 and carries the piston 26.

In the open condition of the solenoid valve 48, that is, the position of connection o he chamber 42 of the actuator 40 with the accumulator 45, the piston 26 is urged by the thrust member 50 and advances towards the first space 30a in the chamber 18 so that its appendage causes the obturator of the one-way valve 22 to move away from its closed position.

When the solenoid valve 48 is moved into its discharge position, however, the spring 51 moves the piston 43 in the direction corresponding to the movement of the piston 26 away from the first space 30a in the chamber 18, enabling the one-way valve 22 to return to the closed position.

Two solenoid valves which are structurally identical to each other are indicated 54 and each of these is connected to a respective chamber 18, 20 of the actuator 16 and to a respective group of brake members $B_1$–$B_4$. In particular, one of the two solenoid valves 54 is connected to the group of brake members constituted by the brakes $B_2$, $B_3$, while the other solenoid valve 54 is connected to the second group of brake members $B_1$, $B_4$.

Each solenoid valve 54 can be seen to include:
a first intake duct 54 connected to the fluid pressure source S through one of the lines 12, 14,
a second intake duct 58 communicating with a first space 30a or 32a of the respective chamber 18 or 20, and
two ducts 60 terminating at the brake members $B_1$, $B_4$, $B_2$, $B_3$ respectively.

A braking corrector device F of known type is interposed, according to known criteria, in the ducts 60 which carry the fluid operating pressure to the rear brake members $B_3$, $B_4$.

In each solenoid valve 54, the first and second intake ducts 56, 58 are connected (the first directly and the second through the one-way valves 22 and 24) to the same line 12 or 14 branching from the master cylinder S.

Each solenoid valve 54 is also provided with first and second obturators, indicated 62 and 64, which can be controlled independently so as to control the opening and closing of the first duct 56 and the second duct 58 of the solenoid valve itself.

In general, the first obturator 62 is of the normally-open type, while the second obturator 64 is of the normally-closed type.

The operation of the solenoid valve 48 which controls the fluid pressure actuator 40 and that of the solenoid valve 54 is controlled by the unit 10 in dependence on signals of the movement of the wheels generated by sensors (phonic wheels) $R_1$–$R_4$ according to criteria which will be described briefly below.

Under normal running conditions (absence of braking) the solenoid valve 48 and the solenoid valve 54 are kept in their de-energised positions. The chamber 42 of the actuator 40 is kept in communication with the accumulator 45 whereby the thrust member 50 acts on the piston 26 and keeps the one-way valve 22 in the open position.

As a result of the thrust exerted by the member 50 on the piston 26, there is a certain fluid pressure in the first space 30a of the first chamber 18 which is also transferred to the second space 32b of the second chamber 20 through the duct 34. The piston 28 in this chamber is thus also thrust towards the respective one-way valve 24 the obturator of which is hence kept in the open position. It is noted, for this purpose, that the second obturators 64 of the solenoid valves 54 are normally closed and thus prevent the passage of pressurised fluid through the intake ducts 58.

In order brake the vehicle, the driver presses the pedal P whereby the fluid pressure generated in the master cylinder F is propagated to the distributor 16 through the lines 12 and 14. The fluid pressure may propagate through the first ducts 56, which are kept open, to the ducts 60 and through the latter to the brake members.

The one-way valves 22, 24 remain in the open position until the pressure which is applied through them to the pistons 26 and 28 reaches a predetermined maximum value envisaged for the intervention of the wheel anti-locking function.

When one of the sensors $R_1$ or $R_2$ transmits to the unit 10 a tachometric signal which indicates the tendency of the respective wheel to lock, the unit 10 causes the energisation of the solenoid valve 48. communication between the chamber 42 of the actuator 40 and the accumulator 35 is then prevented and that between the chamber 42 and the discharge 49 is opened. The spring 51 then urges the piston 43 towards the chamber 42 and the rod 40 causes the withdrawal of the piston 26. The latter thus moves away from the valve 22 which closes due to the high pressure difference to which it is subject.

As a result of the connection between the first space 30a of the first chamber 18 and the second space 32b of the second chamber 20 established by the duct 34, the movement of the piston 26 away from the one-way valve 22 causes a corresponding movement of the piston 28 away from the one-way valve 24 which also closes.

If, one analysis of the signal output by the respective sensor, the unit 10 detects the persistence of the tendency of a wheel to lock, the unit 10 causes a reduction in the intensity of the braking action exerted on this wheel.

For this purpose, the unit 10 first closes the first obturator 62 of the respective solenoid valve 54 at which terminates the duct 60 transferring the braking pressure to the wheel which is tending to lock. Thus, the wheel in question, or more precisely the brake member associated therewith, is so to speak separated from the master cylinder S (holding position).

Subsequently, the unit 10 causes the opening of the second obturator 64 of the same solenoid valve 54 so as to cause the opening of the second intake duct 58 of the solenoid valve itself. In these conditions, the pressurised brake fluid accumulated in the duct 60 can flow into the first space 30a or 32a of the chamber 18, 20 with which the respective solenoid valve 54 is connected.

The thrust exerted by the member 50 being absent, the piston 26 or 28 mounted in the chamber 18, 20 in which the discharge of pressure of the brake fluid occurs moves without load, that is, without facing substantial resistance, whereby the wheel which had tended to lock is immediately released from the braking action.

It may be noted that, once the solenoid valve 48 has been energised and the piston 26 disengaged from the thrust member 50, the operation of the obturators 62 and 64 of each solenoid valve 54 mauy be controlled by the unit 10 wholly independently of the obturators 62, 64 of the other solenoid valve 54.

It is thus possible to exert an independent anti-locking action on each of the groups in which the brake members of the vehicle are arranged. Thus, in the case of FIG. 1, the braking pressure applied to the members $B_1$ and $B_4$ located along a diagonal may be reduced (obturator 64 open) while the braking pressure applied to the members $B_2$ and $B_3$ of the other diagonal may be maintained (obturators 62 and 64 both in the closed position).

Alternatively, the braking pressure may be reduced on both diagonals but during time intervals which are at least partly separate (different instants of opening of the obturators 64 of the two solenoid valves 54). The same is true for other arrangements of groups of brake members: for example, it is possible to exert the anti-locking function on the wheels of the two axles or on the wheels of each axle according to different criteria.

Immediately the tachometric signal generated by the sensor associated with the wheel which is in risk of locking indicates that the wheel itself has started to rotate again at a velocity such as to ensure good road-holding, the unit 10 re-establishes the conditions which enable the braking of this wheel to be resumed.

For this purpose, the unit 10 again causes the de-energisation of the solenoid valve 48, restoring the communication between the chamber 42 of the actuator 40 and the accumulator 45. Consequently, the piston 43, with its rod 40, is again thrust towards the one-way valve 22 to cause the compression of braking fluid which is in the first space 30a of the respective chamber 18. A similar thrust towards the one-way valve 24 is induced in the piston 28 as a result of the fluid connection established by the duct 34. Again in this case, there is thus a reduction in the first volume 32a into which faces the second intake duct 58 of the solenoid valve 54.

The brake fluid thus passes through these second ducts (or at least through those of them which are open, that is, made accessible, bringing the respective obturator 64 into the open position with a fulfilment of the anti-locking action) to collect in the chambers 18 and/or 20 during the carrying out of the anti-locking action and may again flow through the duct 60 to the brake members.

In other words, the thrust developed by the member 50 as soon as the solenoid valve 48 is de-activated leads immediately to the transmission of fluid braking pressure to the brake members previously subjected to the anti-locking function.

At the end of their advance stroke towards the one-way valves 22 and 24, the pistons 26 and 28 return the obturators of these valves to the open positions.

The fluid braking pressure generated by the source S may thus be transferred directly to the brake members through the valves 22 and 24 returned to the open position, by means of the second ducts 58 which were previously open, rapidly and completely re-establishing the braking action.

When the tendency of this same wheel or another wheel of the vehicle to lock is manifested, the unit 10 re-activates the anti-locking function according to the criteria described above, the solenoid valve 54 controlling the brake members associated with the wheel which is tending to lock being operated.

It is thus possible to start an alternating sequence of operations of reduction of the braking (brake release) and renewal of the braking (re-braking) which enables the loss of road-holding of the wheels to be avoided.

Naturally, the unit 10 is usually sensitive (a sensor with a dedicated connection, not illustrated, may be provided for this purpose) to the interruption of the braking action, that is, to the release of the pedal P by the driver. In this case, the unit 10 restores the normal running conditions of the vehicle (solenoid valve 48 de-energised and solenoid valve 54 also de-energised.

Finally, it should be noted that the presence of the two one-way valves 22 and 24 means that the fluid braking pressure generated at any moment by the driver operating the master cylinder S is compared continuously during the activation of the anti-locking function with the fluid pressure present in the first space 30a, 32a of each of the chambers 18 and 20, causing an immediate reduction in the latter when the pressure at the source S is reduced as a result of the intensity of the braking action effected by the driver.

This avoids the operating pressure applied to the brake members during the renewal of braking (re-braking) accidentally surpassing that imposed by the driver acting on the pedal P.

It should be noted that the fluid pressure for the supply of the chamber 42 of the actuator 40 could be derived from other alternative sources, such as, for example, the coolant circuit of the engine or even a circuit using an auxiliary pump, instead of from the lubricating circuit of the vehicle engine.

The embodiment illustrated in FIG. 2 is generally similar to that of FIG. 1 and only the differences will be described in detail, the same reference numerals being used for numerical or like parts.

In this variant, the pressurised fluid coming from the lubricating circuit C (or from another alternative source) is supplied through a solenoid valve 48 to the chamber 44 of the actuator 40, while a strong helical compression spring 55 is inserted in the chamber 42 and urges the piston 43 towards the distributor 16. The solenoid valve 48 in this case is normally closed so as to keep communication between the chamber 44 and the circuit C closed and communication between the chamber 44 and the discharge 49 open. In this case, therefore, the fluid pressure, during energisation and hence opening of the solenoid valve 48, acts on the piston 43 of the actuator 40 in the sense corresponding to closure of the one-way valve 22, while the opening of this valve is maintained by the action of the spring 55.

Naturally, the principle of the invention remaining the same, the constructional details and forms of embodiment may be varied widely with respect to those described and illustrated, without thereby departing from the scope of the invention.

What is claimed is:

1. A device for the selective application to groups of brake members associated with the wheels of a vehicle of a fluid operating pressure generated by a source, wherein it comprises:

a fluid distributor member with a first chamber and a second chamber, each of which carries, for its connection to the source, an associated respective one-way flow valve which is adapted to prevent the propagation of fluid pressure from the source to the respective chamber, a piston being sealingly slidable in each chamber and dividing the chamber itself into a first space communicating with the one-way flow valve associated with respective chamber and a second space, the first space of the first chamber communicating with the second space of the second chamber; each piston carrying associated actuator means adapted to keep the one-way flow valve associated with the respective chamber in its open condition when the piston itself is in a position of advancement towards the first space of the respective chamber, actuator means selectively operable to apply to the piston mounted in the first chamber a thrusting force directed so as to move the piston itself into a position of advancement towards the first space of the first chamber itself, for each of the first and second chambers and for each group of brake members, a respective valve member with a first intake duct being connected to a source of pressurised operating fluid, a second intake duct communicating with the first space in the respective chamber, and at least one further duct communicating with the brake members of the group; the valve member including first obturator means interposed in the first intake duct and being normally open and second obturator means interposed in the second intake duct and being normally closed, a braking control circuit with sensor means which detect the tendency of the wheels associated with the brake members of the group to lock, and which is adapted to, upon a manifestation of the tendency to lock, control in a selectively predetermined sequence:

the de-activation of the actuator means, with the cutting off of the thrusting force, the closure of the first obturator means fo he respective valve member, and the opening of the second obturator means of the respective valve member, and wherein the actuator means include a fluid pressure actuator with a cylinder and a piston, in which the piston is operatively connected to the piston mounted in the first chamber of the fluid distributor member and divides the cylinder into two spaces of which the first is connected to a pressurised fluid source and the second contains a resilient biassing member which acts on the piston in the opposite sense from the thrust of the pressurised fluid, and a three-way solenoid valve member for controlling communication between the first chamber of the actuator and the pressurised fluid source in one condition and between the first chamber and a discharge in another condition, the solenoid valve member being piloted by the braking control circuit.

2. A device according to claim 1, wherein the fluid pressure acts on the piston of the actuator in the sense corresponding to the position of advancement of the piston mounted in the first chamber of the fluid distributor member.

3. A device according to claim 1, wherein the fluid pressure acts on he piston of the actuator in the opposite sense from that corresponding to the position of advancement of the piston mounted in the first chamber of the fluid distributor member.

4. A device according to claim 1, for motor vehicles driven by an internal combustion engine with a pressurised-oil lubricating circuit, wherein the pressurised fluid source is constituted by a pneumo-hydraulic accumulator supplied by the lubricating circuit of the engine.

* * * * *